United States Patent [19]  [11] 3,952,060
Huber-Emden et al.  [45] Apr. 20, 1976

[54] PERFLUORINATED AMINO COMPOUNDS AND PROCESS FOR THEIR MANUFACTURE

[75] Inventors: Helmut Huber-Emden, Basel; Alberto Deflorin, Riehen, both of Switzerland

[73] Assignee: Ciba-Geigy AG, Basel, Switzerland

[22] Filed: Nov. 11, 1974

[21] Appl. No.: 522,541

[30] Foreign Application Priority Data
Nov. 22, 1973 Switzerland.................. 16473/73

[52] U.S. Cl..................... 260/584 R; 260/583 GG; 260/583 P
[51] Int. Cl.².......................................... C07C 91/04
[58] Field of Search....... 260/583 GG, 584 R, 583 P

[56] References Cited
UNITED STATES PATENTS

| | | | |
|---|---|---|---|
| 2,700,686 | 1/1955 | Dickey et al. | 260/584 R X |
| 3,714,259 | 1/1973 | Lichtenwalter et al. | 260/583 P |
| 3,769,307 | 10/1973 | Moreau et al. | 260/404.5 |
| 3,810,874 | 5/1974 | Mitsch et al. | 260/583 P X |

FOREIGN PATENTS OR APPLICATIONS

| | | |
|---|---|---|
| 1,210,842 | 11/1970 | United Kingdom |
| 1,269,096 | 3/1972 | United Kingdom |
| 1,286,791 | 8/1972 | United Kingdom |
| 758,156 | 10/1956 | United Kingdom ........ 260/583 GG |
| 410,006 | 10/1966 | Switzerland .............. 260/584 R |
| 410,991 | 10/1966 | Switzerland .............. 260/584 R |

Primary Examiner—Allen B. Curtis
Attorney, Agent, or Firm—Joseph G. Kolodny; Prabodh I. Almaula; Edward McC. Roberts

[57] ABSTRACT

New perfluorinated amino compounds of the formula

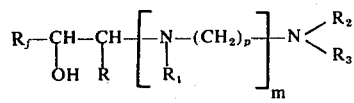

are provided wherein $R_f$ represents a perfluorinated hydrocarbon radical with 1 to 18 carbon atoms and R represents hydrogen or methyl each of $R_1$, $R_2$ and $R_3$ independently represents hydrogen or the radical

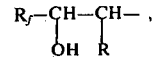

in which $R_f$ and R have the meanings already assigned to them, p is an integer from 2 to 6 and m is an integer from 1 to about 500.

Due to their surface-active properties the new compounds are useful e.g as foaming, wetting and levelling agents or as emulsifiers. They can be further used as soil-repellent additives for polishes and waxes, as corrosion inhibitors in oils or lubricants and they are also useful as intermediates for the manufacture of oil and water repellents.

15 Claims, No Drawings

PERFLUORINATED AMINO COMPOUNDS AND PROCESS FOR THEIR MANUFACTURE

The present invention provides perfluorinated amino compounds of the formula (1) 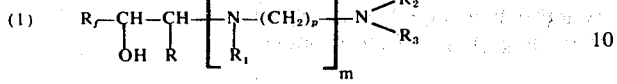

wherein $R_f$ represents a perfluorinated hydrocarbon radical with 1 to 18 carbon atoms and R represents hydrogen or methyl, each of $R_1$, $R_2$ and $R_3$ independently represents hydrogen or the radical

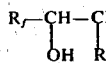

in which $R_f$ and R have the meanings already assigned to them, $p$ is a integer from 2 to 6 and $m$ is an integer from 1 to about 500.

The perfluorinated hydrocarbon radical can be preferably a straigth-chain or a branched perfluoroalkyl radical with 4 to 14 carbon atoms and can have e.g the following formulae:

| | |
|---|---|
| $F(CF_2)_p-$ | $p = 4-14$ |
| $(CF_3)_2CF(CF_2)_q-$ | $q = 1-11$ |
| $CF_3[CF_2CF(CF_3)]_r-$ | $r = 1-4$ |
| $(CF_3)_2CF[CF_2CF(CF_3)]_s-$ | $s = 1-3$ |

ω-H-perfluoroalkyl radicals are also possible.

The compounds according to the invention preferably have the formula (2) 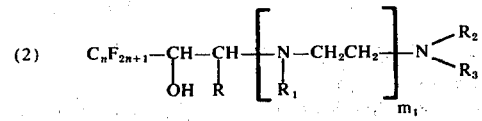

wherein R represents hydrogen or methyl, each of $R_1$, $R_2$ and $R_3$ independently represents hydrogen or the radical

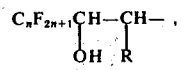

wherein R has the meaning previously assigned to it, $m_1$ is an integer from 1 to 3 and $n$ is a whole number from 4 to 14.

Other particularly suitable compounds have, for example, the formulae (3) 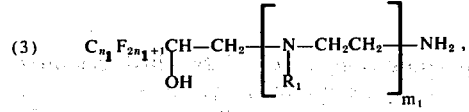

especially (3a) 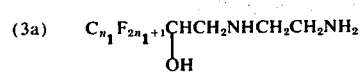

and (4) 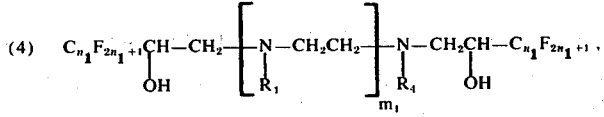

in particular (4a) 

wherein each of $R_1$ and $R_4$ independently represents hydrogen or the radical

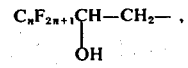

$m_1$ is an integer from 1 to 3, preferably 1, and $n_1$ is an integer from 6 to 12.

Further perfluorinated amino compounds have the formulae (5) 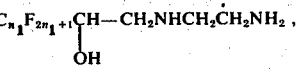

(6) 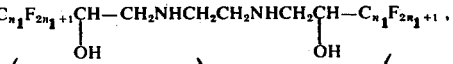

(7) 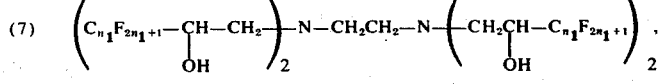

also the corresponding compounds of diethylenetriamine, dipropylenetriamine and triethylenetetramine, of hexamethylenediamine or of polyethyleneimines. Mention may also be made of monoacyl compounds, especially the monoacetyl compounds, which are obtained by reaction of perfluoroalkyl epoxides or chlorohydrins with monoacylated amines. The acyl group can be removed again by hydrolysis. Monoacylated amines can be used e.g. in order to manufacture the unsymmetrically substituted compounds of the present invention.

There are therefore obtained, for example, compounds of the formulae (8) 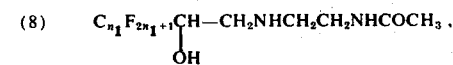

and

(90) 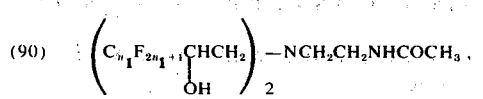

and corresponding compounds of the cited triamines, tetramines, and, optionally the polyamines.

The compounds according to the invention of the formula (1) can be manufactured by different processes. For example, they are obtained by reacting perfluoroalkyl epoxides of the formula

(10) 

or perfluoroalkyl chlorohydrins of the formula

(11) 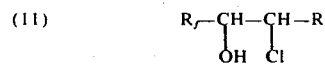

with amines of the formula

(12) 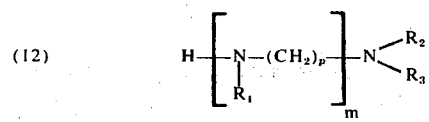

In the formulae (10) and (11), $R_f$ represents a perfluorinated hydrocarbon radical with 1 to 18 carbon atoms and $R_1$ represents hydrogen or methyl, and $R_2$, $R_3$, $m$ and $p$ have the meanings previously assigned to them.

The perfluoroalkyl epoxides or perfluoroalkyl chlorohydrins used in the process according to the invention contain preferably 4 to 14 carbon atoms in the perfluoroalkyl moiety. The epoxides and chlorohydrins which contain 4 to 14 and 6 to 12 carbon atoms respectively in the perfluoroalkyl moiety are particularly suitable and therefore have the formulae

(13) 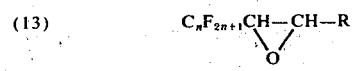

(14) 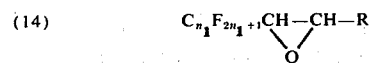

(15) 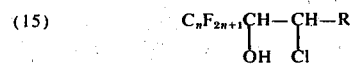

(16) 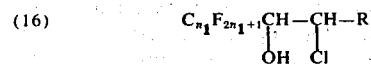

wherein R represents hydrogen or methyl and $n$ is an integer from 4 to 14 and $n_1$ is an integer from 6 to 12.

The epoxides and chlorohydrins used as starting materials are e.g. known from French Patent No. 2,120,251.

Preferred amines which can be used in the reaction are ethylenediamine, diethylenetriamine, dipropylenetriamine, triethylenetetramine, hexamethylenediamine and polyethyleneimines that contain up to about 500 recurring units of the formula

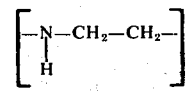

and have molecular weights between about 10,000 and 20,000.

The diamines or polyamines which participate in the reaction — preferably if they are liquid at room temperature — can be used as solvent in the manufacturing process according to the invention. Optionally, it is possible to use in addition other solvents that do not interfere adversely with the reaction. Examples of such solvents are water, alcohols, e.g. methanol, or ethers, e.g. diethyl ether, dimethoxyethane, dioxan and tetrahydrofuran.

The amines can be used in any desired molar ratios with the perfluoroalkyl epoxides or chlorohydrins. A surplus of amine is preferably used for 1:1 adducts, whereas a corresponding surplus of the perfluoroalkyl compound (epoxide or chlorohydrin) is used for adducts in which some or all hydrogen atoms bonded to nitrogen are replaced by perfluoroalkyl radicals. If the amines are liquid at room temperature and a surplus thereof is used, then apart from doing duty as reactants they can also be used to bind the hydrogen chloride that forms during the reaction (provided chlorohydrins are the reactants). Optionally, an alkali hydroxide can be additionally used for this purpose. The reaction can be carried out in a temperature range of about 20° to 150°C. A suitable temperature is in each case the reflux temperature of the amine used in the reaction or, if a solvent is used, the corresponding temperature of the solvent.

The reaction of a primary amino group (R—NH$_2$) or of a secondary amino group RR′NH with a perfluoroalkyl epoxide or chlorohydrin can normally be carried out in a temperature range from room temperature (20°C) to about 150°C.

Alkylenediamines or alkylenepolyamines which are unsymmetrically substituted by the radicals

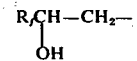

can also be obtained from the corresponding monoacyl compounds and by subsequent saponification of the amide function. The reaction course can be described in the following manner:

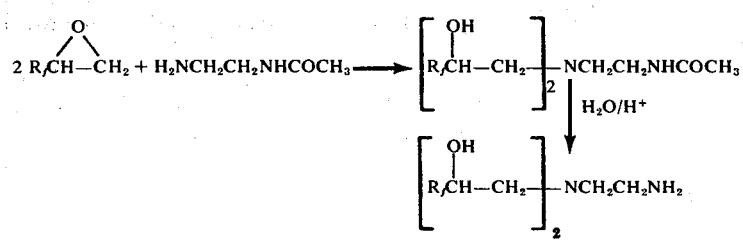

The time required to perform the reaction can vary within wide limits and depends on the reactivity of the reactants.

The reaction mixture can be processed by conventional methods, e.g. by distillation or crystallisation. The novel perfluororinated amino compounds so obtained are partially soluble in water, aqueous acids or solutions of hydroxides. They exhibit an amorphous behaviour (basic amino groups, acid OH groups).

The perfluoroalkylaminoalkanols are useful intermediates for the manufacture of oil and water repellents. They are also suitable for use as soil repellent additives for polishes and waxes, as corrosion inhibitors in oils or lubricants and, on account of their surface-active properties, as foaming agents, wetting agents, emulsifiers and as levelling agents for dyestuff preparations, e.g. in lacquers and paints, and for finishing metal, glass and plastic surfaces.

The following Examples illustrate the invention but without limiting it to what is described therein. Parts and percentages are by weight.

EXAMPLE 1

A mixture of 4.62 g of perfluorooctylethylene oxide and 12 g of ethylenediamine is stirred for one-half hour at 80°C. The reaction mixture is then allowed to stand for about 12 hours, in the course of which time the bulk of the reaction product precipitates in compact crystals. The supernatant solution is decanted off and the residue is purified by fractional molecular distillation at 100°C/0.001 Torr. Yield: 4.0 g (76.5% of theory) of the compound of the formula (101)   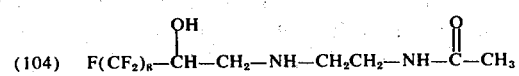

Melting point: 87°C
Analysis: Found: C, 27.8; H, 2.0; N, 5.6. Calculated: C, 27.6; H, 2.1; N, 5.4.

The substance dissolves in hot water (with vigorous foaming), hot dilute sodium hydroxide solution, cold dilute acetic acid and cold dilute hydrochloric acid. These solutions are also stable at room temperature. The solution in water is viscose at room temperature.

EXAMPLE 2

A mixture of 4.62 g of perfluorooctylethylene oxide and 0.30 g of ethylenediamine is stirred for one-half hour at 50°C, in the course of which time the reaction mixture thickens. The mixture is allowed to stand for ablut 12 hours at room temperature. Fractional molecular distillation at 180°C/0.001 Torr then yields 2.0 g (42.4% of theory) of the compound of the formula (102)   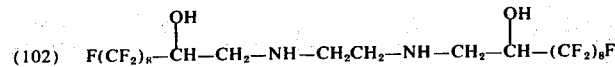

Melting point: 156°C
Analysis: Found: C, 26.8; H, 1.5; N, 2.8. Calculated: C, 26.8; H, 1.4; N, 2.8.

EXAMPLE 3

A mixture of 5.09 g of perfluorooctylethylene oxide and 0.15 g of ethylenediamine is stirred for 2 hours at 140°C. The reaction mass is allowed to cool, when it congeals. Recrystallisation from dioxan yields 4.1 g (78.2% of theory) of the compound of the formula (103)   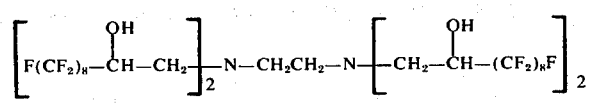

Melting point: 122° to 123°C
Analysis: Found: C, 26.4; H, 1.0; N, 1.6. Calculated: C, 26.4; H, 1.1; N, 1.5.

EXAMPLE 4 a. A mixture of perfluorooctylethylene oxide and 6.13 g of monoacetylethylenediamine is stirred for one-half hour at 100°C. The reaction mixture congeals on cooling. It is stirred with 50 ml of water, the resultant precipitate is collected by suction filtration, washed neutral with as little water as necessary and dried. Yield: 10.6 g (94of theory) of the compound of the formula (104)   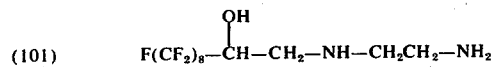

Melting point: 113°C (after recrystallisation from toluene)
Analysis: Found: C, 29.5; H, 2.5; N, 4.7. Calculated: C, 29.8; H, 2.5; N, 5.0.

b. A hot solution of 11.3 g of the compound of the formula (104) in a mixture of 30 ml of 4 normal sulphuric acid and 10 ml of dioxan is refluxed for 40 hours, in the course of which time a precipitate forms. Then 100 ml of 2 normal sulphuric acid are added and the batch is allowed to cool. The product is collected by suction filtration, the filter residue is washed neutral and dried. Yield: 12.1 g (97.4% of theory) of the compound of the formula (105)   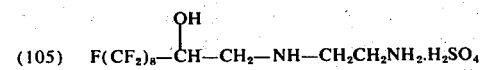

Decomposition point: from 280°C
Analysis: Found: S, 5.4. Calculated: S, 5.2.

c. A mixture of 10 g of the compound of the formula (105) and 161.3 ml of 0.1 normal sodium methylate solution in methanol is refluxed for 2 hours. The reaction mixture is allowed to cool and the precipitated sodium sulphate is filtered off with suction and washed with methanol. The solvent is then distilled off from the filtrate. After being dried at 40°c in a water jet vacuum, the initially oily residue crystallises on cooling. It is purified by fractional molecular distillation at 85° to 120°C/0.001 Torr. Yield: 6.0 g (71.3% of theory) of the compound of the formula (101).
Melting point: 86° to 87°C.

EXAMPLE 5 a. A mixture of 9.24 g of perfluorooctylethylene oxide and 0.816 g of mono-acetylethylenediamine is stirred for 3 hours at 110°C. The reaction mass congeals on cooling. It is recrystallised from toluene to yield 7.25 g (70.6% of theory) of the compound of the formula

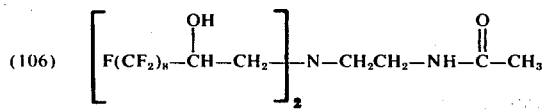

Melting point: 101° to 102°C.

Analysis: Found: C, 28.2; H, 1.8; N, 2.6. Calculated: C, 28.1; H, 1.6; N, 2.7.

b. A mixture of 10.3 g of the compound of the formula (106) and 200 ml of 4 normal sulphuric acid is stirred for 100 hours with stirring under reflux. After the reaction mixture has cooled, the precipitate is filtered off with suction, washed neutral and refluxed again for 10 minutes with 200 ml of water with stirring. The batch is allowed to cool and the precipitate that has formed is comminuted, filtered off with suction and dried in a desiccator. Yield: 9.0 g (85% of theory) of the compound of the formula

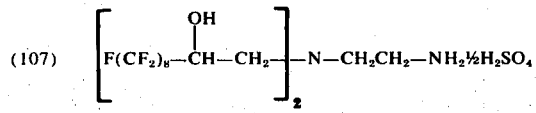

Decomposition from about: 100°C

Analysis: Found: S, 1.6. Calculated: S, 1.6.

c. A mixture of 7.8 g of the compound of the formula (107) and 75.6 ml of 0.1 normal sodium methylate solution in methanol is refluxed for 2½ hours with stirring. The reaction mixture is allowed to cool, the precipitated sodium sulphate is filtered off with suction and is washed with methanol. The solvent is then distilled off from the filtrate. The initially oily residue is dried at 40°C in a water jet vacuum and congeals after cooling to room temperature. Yield: 6.0 g (80.7% of theory) of the compound of the formula

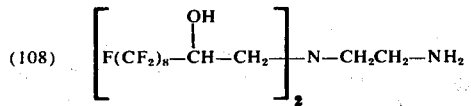

Melting point: 81°C (after recrystallisation from benzene)

Analysis: Found: C, 26.8; H, 1.7; N, 3.2. Calculated: C, 26.8; H, 1.4; N, 2.9.

EXAMPLE 6

A mixture of 20. 8 g of diethylenetriamine and 4.61 g of perfluoroalkylethylene oxide homologue mixture[1] is heated with stirring at about 60°C and after a few minutes the mixtures becomes homogenous. The temperature is then raised to 80°–85°C and held thereat for 2 hours. Excess diethylenetriamine is removed from the reaction product at 95°–100°C in a high vacuum. Yield: 5.4 g (95.5% of theory) of a viscose, clear, brownish oil which is soluble in dilute acetic acid.

1) 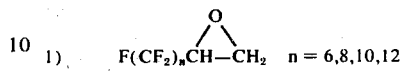 n = 6,8,10,12

EXAMPLE 7

A mixture of 0.312 g of diethylenetriamine and 4.149 g of perfluoroalkylethylene oxide homologue mixture according to Example 6 is reacted as described therein. Yield: 4.3 g (96.2% of theory) of a clear, yellowish, highly viscose oil.

EXAMPLE 8

A solution of 4.61 g of perfluoroalkylethylene oxide homologue mixture according to Example 6 and 3.47 g of polyethyleneimine (M~15000) in 20 ml of methanol is refluxed for 2 hours in a water bath. The resultant two phase mixture is freed from solvent in vacuo. Yield 6.1 g (97% of theory) of a yellowish, clear, resinous mass.

EXAMPLE 9

Surface tension of aqueous solutions in dyn cm$^{-1}$ at 22°C.

TABLE I

| | Concentration in g/liter | | | | | | |
|---|---|---|---|---|---|---|---|
| | 5 | 1 | 0,5 | 0,25 | 0,1 | 0,05 | 0,01 |
| Compound (101) | 16 | 17 | 17 | 18 | 18 | 22 | 45 |
| Compound (104) | *) | 23 | 23 | 23 | 24 | 27 | 34 |

*)Solubility limit exceeded

EXAMPLE 10

Surface tension (in dyn cm$^{-1}$) of the hydrochlorides (Table 2) and acetates (Table 3) of the aminoalcohols according to the invention. The solutions are manufactured by dissolving the substances in the x-fold stoichiometric amount of 0.02 normal hydrochloric acid and acetic acid respectively and diluting the solutions to the indicated concentrations.

TABLE 2

| | | | Hydrochloride | | | | |
|---|---|---|---|---|---|---|---|
| | | temperature | Concentration g/liter | | | | |
| | X | | 5 | 1 | 0,5 | 0,25 | 0,1 | 0,05 |
| Compound (101) | 1 | 22° | 16 | 17 | 17 | 21 | 25 | 38 |
| | | 70° | 14 | 14 | 16 | 17 | 28 | 29 |
| | 2 | 22° | 20 | 27 | 28 | 29 | 30 | 43 |
| | | 70° | 19 | 19 | 22 | 25 | 30 | 33 |
| Compound (104) | 1 | 22° | *) | 22 | 23 | 24 | 27 | 32 |
| | | 70° | 16 | 17 | 17 | 17 | 18 | 19 |

TABLE 3

| | | | Acetates | | | | |
|---|---|---|---|---|---|---|---|
| Compound | | | | | | | |
| (101) | 1 | 22° | 17 | 18 | 18 | 22 | 31 | 37 |
| (104) | 2 | 22° | 18 | 21 | 22 | 27 | 30 | 40 |
| (108) | 1 | 22° | 18 | 23 | 24 | 25 | 26 | 28 |
| | 1 | 22° | *) | *) | *) | 27 | 31 | 35 |
| | | 70° | *) | *) | 18 | 18 | 20 | 23 |
| Example 6 | *** | 25° | 25,8 | 29,3 | 29,7 | 31,7 | 28,0 | 34,8 |
| Example 7 | *** | 25° | 20,3 | 25,4 | 29,8 | 33,4 | 39,2 | 39,8 |
| Example 8 | *** | 25° | 44,7** | 59,2 | 59,7 | 62,1 | 61,4 | 68,1 |

*) Solubility limit exceeded
**) turbid solution
***) large surplus of acetic acid

We claim:
1. Perfluorinated amino compounds of the formula

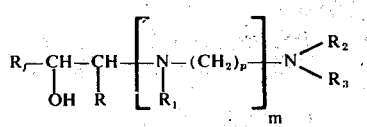

wherein $R_f$ represents a perfluorinated hydrocarbon radical with 1 to 18 carbon atoms and R represents hydrogen or methyl each of $R_1$, $R_2$ and $R_3$ independently represents hydrogen or the radical

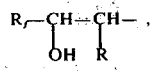

in which $R_f$ and R have the meanings already assigned to them, p is an integer from 2 to 6 and m is an integer from 1 to about 500.

2. Perfluorinated amino compounds according to claim 1, wherein the perfluorinated hydrocarbon radical is a straight-chain or a branched perfluoroalkyl radical with 4 to 12 carbon atoms.

3. Perfluorinated amino compounds according to claim 1, of the formula

wherein R represents hydrogen or methyl, each of $R_1$, $R_2$ and $R_3$ independently represents hydrogen or the radical

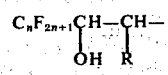

in which R has the meaing already assigned to it, $m_1$ is an integer from 1 to 3 and n is an integer from 4 to 14.

4. Perfluorinated amino compounds according to claim 3, of the formula

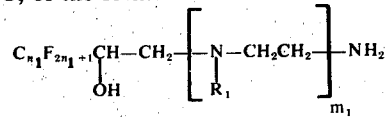

wherein $R_1$ represents the radical

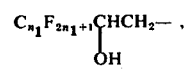

is an integer from 1 to 3 and $n_1$ is an integer from 6 to 12.

5. Perfluorinated amino compounds according to claim 4, of the formula

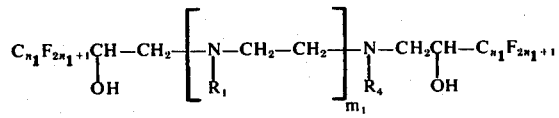

wherein $R_1$ and $R_4$ represent hydrogen or the radical

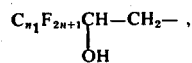

$m_1$ is an integer from 1 to 3 and $n_1$ is an integer from 6 to 12.

6. Perfluorinated amino compounds according to claim 4, of the forumla

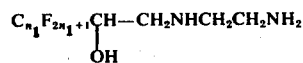

wherein $n_1$ is an integer from 6 to 12.

7. Perfluorinated amino compounds according to claim 5, of the formula

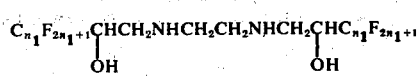

wherein $n_1$ is an integer from 6 to 12.

8. Perfluorinated amino compounds according to claim 1, of the formulae

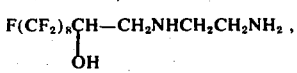

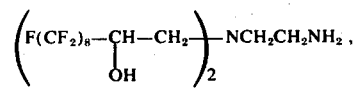

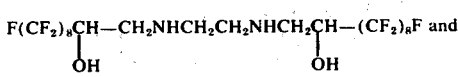

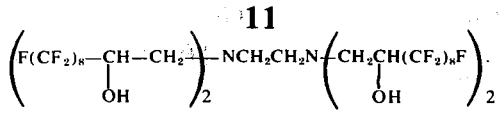

9. A process for the manufacture of perfluorinated amino compounds of the formula

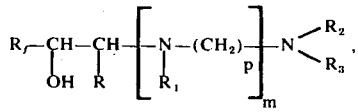

wherein $R_f$ represents a perfluorinated hydrocarbon radical with 1 to 18 carbon atoms and R represents hydrogen or methyl, each of $R_1$, $R_2$ and $R_3$ independently represents hydrogen or the radical

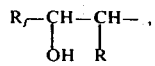

in which $R_f$ and R have the meanings already assigned to them, p is an integer from 2 to 6 and m is an integer from 1 to about 500, which process comprises reacting perfluoroalkyl epoxides of the formula

or perfluoroalkyl chlorohydrins of the formula

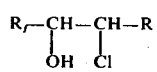

with amines of the formula

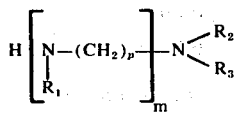

10. A process according to claim 9, wherein the perfluoroalkyl epoxides or perfluoroalkyl chlorohydrins contain straight-chain or branched perfluoroalkyl radicals with 4 to 14 carbon atoms.

11. A process according to claim 9, which comprises reacting perfluoroalkyl epoxides of the formula

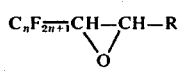

or perfluoroalkyl chlorohydrins of the formula

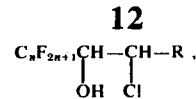

wherein R represents hydrogen or methyl and n is an integer from 4 to 14, with amines of the formula

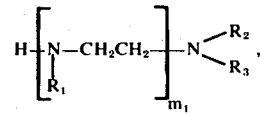

wherein each of $R_1$, $R_2$ and $R_3$ independently represents hydrogen or the radical

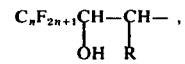

in which R has the meaning assigned to it and $m_1$ is an integer from 1 to 3.

12. A process according to claim 11, which comprises reacting perfluoroalkyl epoxides of the formula

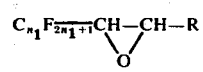

or perfluoroalkyl chlorohydrins of the formula

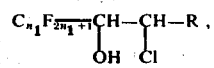

wherein R represents hydrogen or methyl and $n_1$ is an integer from 6 to 12, with amines of the formula

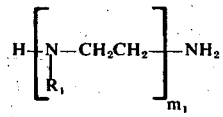

wherein $R_1$ represents the radical

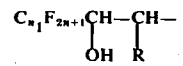

in which R has the meaning already assigned to it and $m_1$ is an integer from 1 to 3.

13. A process according to claim 11, which comprises carrying out the reaction at temperatures from 20° to 100°C.

14. A process according to claim 11, which comprises carrying out the reaction in a solvent which is inert to the reactants.

15. A process according to claim 11, which comprises carrying out the reaction in the presence of compounds that give alkaline reaction.

* * * * *